P. S. LIETZ.
PNEUMATIC TIRE.
APPLICATION FILED APR. 9, 1919.
1,315,136.
Patented Sept. 2, 1919.
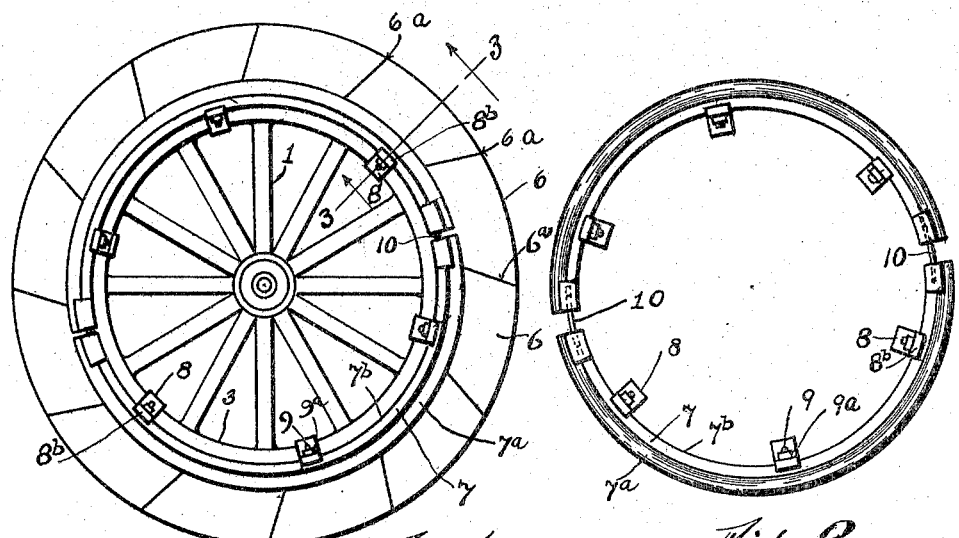
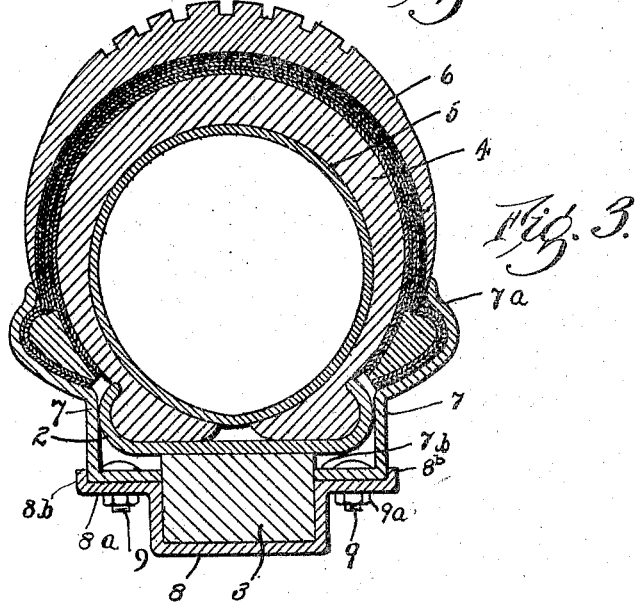
Inventor,
Paul S. Lietz
By (signature) Atty.

UNITED STATES PATENT OFFICE.

PAUL S. LIETZ, OF CHICAGO, ILLINOIS.

PNEUMATIC TIRE.

1,315,136.  Specification of Letters Patent.  Patented Sept. 2, 1919.

Application filed April 9, 1919. Serial No. 288,869.

*To all whom it may concern:*

Be it known that I, PAUL STANTON LIETZ, a citizen of the United States, residence at Chicago, Ill., have invented certain new and useful Improvements in Pneumatic Tires, of which the following is a specification.

My invention relates to improvements in pneumatic tires, and more particularly to the outer tire casing or shoe, together with improved means for mounting, securing and adjusting the same.

My invention relates more particularly to a transversely divided tire casing made up of a plurality of abutting tire sections, together with improved means for independently securing and adjusting said tire sections.

More specifically speaking, my invention embodies what may be termed a protective casing made up of a plurality of abutting sections cut from old or used tire casings, adapted to be readily attached to or detached from an ordinary tire casing for the purpose of protecting the same, as well as extending its wear or mileage, the invention being particularly designed and adapted for utilizing old or used tire casings.

The invention further relates to improved means for independently securing and adjusting such protective casing sections, such means preferably comprising a plurality of radially movable split rims adapted to detachably secure the sections of the protective casing and adjust the same through the medium of improved supporting and clamping members adapted to be readily attached to and detached from any ordinary wheel felly or rim.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a side elevation of an ordinary wheel and pneumatic tire equipped with my improved radially divided protective casing and improved mounting and securing means therefor.

Fig. 2, a side elevation of one of the auxiliary or split rims, detached, and constituting a part of the means for independently securing and mounting the casing sections.

Fig. 3, an enlarged cross sectional view taken on line 3—3, of Fig. 1.

Similar numerals of reference designate like parts throughout all of the figures of the drawings.

The wheel 1, rim 2, and felly 3, may be of any suitable and convenient form, and so likewise the casing 4 and inner tube 5. In the present instance, the rim 2, and casing 4, are of the clencher type.

The improved protective casing comprises a plurality of abutting casing sections 6. The casing sections 6, may be cut into suitable lengths from old or used tires, but are preferably of like form and dimensions and relatively short in length, thereby forming a number of heat contracting and expanding joints $6^a$, such sections and joints lessening the danger of damage from great frictional heat and heat and air expansion resulting in blow outs. The joints $6^a$, preferably extend in a direction slightly inclined from the true radial direction, as shown in the drawings.

As a means of securing and adjusting the casing sections 6, radially movable split rims 7, are provided, said rims being mounted at the sides of the wheel felly and terminating in casing engaging members $7^a$, the latter, in the present instance, being in the form of clencher members adapted to engage the clencher portions of the casing sections.

As a means of movably securing the split rims 7, wheel felly engaging members are provided, said members, in the present instance, being in the specific form of cross members 8, provided with off-set felly engaging portions terminating in side members $8^a$, the latter preferably terminating in radially extending flanges $8^b$. The off-set portions of the clamp members 8, form rim receiving recesses and the side members $8^a$, and flanges $8^b$, form guides for the base portions $7^b$, of the split rims 7, as the latter are adjusted as hereinafter described.

As a means of radially contracting the split rims 7, and thereby drawing the casing sections 6, toward the center of the wheel to conform to the inflation and size and contour of the tire casing, the base members $7^b$, of the split rims are provided with openings adapted to receive and contain adjusting members 9, the latter, in the present instance, being in the form of threaded bolts 9, adapted to be drawn up through the medium of the nuts $9^a$.

In applying the improved protective casing to an inflated tire, the tire is first preferably partially deflated and the casing sections 6, may be then placed upon the same, as likewise the split rims 7, and in the form or embodiment shown in the drawings, approximately half of the sections and corresponding holding rims 7, may be then adjusted and secured in place, after which the remaining casing sections and remaining split rims may be assembled and the parts drawn up, and when then adjusted the tire may again be inflated.

As a means of movably securing and guiding the adjacent split ends of the split rims 7, so that the latter may be readily moved radially by the adjusting members 9, the ends of said split rims are provided with openings adapted to receive and contain guide members 10, as shown most clearly in Fig. 2, of the drawings.

From the foregoing description, taken in connection with the accompanying drawings, the operation and advantages of my invention will be readily understood.

Having thus described some of the embodiments of my invention, what I claim and desire to secure by Letters Patent, is,—

1. A pneumatic tire, comprising a protective casing, a wheel felly provided with off-set cross members having guides, and split rims adjustably mounted in the latter.

2. A pneumatic tire, comprising a tire casing, a wheel felly, split rims on opposite sides of the latter, and detachable cross members carried by said wheel felly and provided with guides and fastening devices detachably and adjustably supporting said split rims.

3. A pneumatic tire, comprising a protective casing, a wheel felly provided with a rim, split rims on opposite sides of the latter, cross members carried by said wheel felly and provided with guides, and adjusting devices on the latter detachably and adjustably supporting said split rims.

4. In a protective device for pneumatic tires, the combination with a wheel felly and pneumatic tire, and a protective casing; of a plurality of split rims on opposite sides of said wheel felly detachably secured to the base portions of said protective casing, a plurality of cross members provided with off-set felly engaging portions terminating in side members having radially extending flanges, said side members and flanges forming guides for movably receiving said split rims, and adjusting and connecting members passing through said split rims and side members for moving and adjusting said split rims and tire casing.

Signed and dated at Chambersburg, Pa., this 1st day of March 1919.

PAUL S. LIETZ.

Copies of this patent may be obtained for five cents each, by addressing the "Commissioner of Patents, Washington, D. C."